United States Patent [19]

Mazur et al.

[11] Patent Number: 5,566,974
[45] Date of Patent: Oct. 22, 1996

[54] METHOD AND APPARATUS FOR RESTRAINING AN OCCUPANT DURING A SIDE IMPACT

[75] Inventors: Joseph F. Mazur, Washington; Brian K. Blackburn, Rochester; Scott B. Gentry, Romeo; Charles E. Steffens, Jr., Washington, all of Mich.

[73] Assignee: TRW Vehicle Safety Systems Inc., Lyndhurst, Ohio

[21] Appl. No.: 34,722

[22] Filed: Mar. 22, 1993

[51] Int. Cl.⁶ .................................................. B60R 21/16
[52] U.S. Cl. ....................... 280/730.2; 280/735; 180/282
[58] Field of Search ...................................... 280/734, 735, 280/730 A, 730 R; 180/282, 274

[56] References Cited

U.S. PATENT DOCUMENTS

| | | | |
|---|---|---|---|
| 3,687,213 | 8/1972 | Sato et al. | 280/730 |
| 3,720,426 | 3/1973 | Johnston | 280/730 |
| 3,791,667 | 2/1974 | Haviland | 280/230 |
| 4,381,829 | 5/1983 | Montaron | 180/224 |
| 4,946,191 | 8/1990 | Putsch | 280/730 |
| 4,966,388 | 10/1990 | Warner et al. | 280/730 |
| 4,994,972 | 2/1991 | Diller | 364/424.05 |
| 4,995,639 | 2/1991 | Breed | 280/735 |
| 5,005,861 | 4/1991 | Breed et al. | 280/734 |
| 5,021,678 | 6/1991 | Diller | 280/734 X |
| 5,033,236 | 7/1991 | Szerdahelyi et al. | 49/502 |
| 5,072,966 | 12/1991 | Nishitake et al. | 280/730 |
| 5,083,276 | 1/1992 | Okano et al. | 280/735 X |
| 5,172,790 | 12/1992 | Ishikawa et al. | 280/730 A |
| 5,182,459 | 1/1993 | Okano et al. | 280/735 X |
| 5,202,831 | 4/1993 | Blackburn et al. | 364/424.05 |

FOREIGN PATENT DOCUMENTS

| | | |
|---|---|---|
| 523704 | 1/1993 | European Pat. Off. . |
| 565501 | 10/1993 | European Pat. Off. . |
| 3281459 | 12/1991 | Japan ................. 280/730 A |
| 2220620 | 1/1990 | United Kingdom . |
| PCT/US90/01017 | 9/1990 | WIPO . |

*Primary Examiner*—Christopher P. Ellis
*Attorney, Agent, or Firm*—Tarolli, Sundheim, Covell, Tummino & Szabo

[57] ABSTRACT

An apparatus (10) for restraining an occupant during a side impact of a vehicle with an object includes an air bag (20) mounted in a vehicle door (22) adjacent to the occupant. The door (22) includes an outside panel (26) and an inside panel (28) spaced from the outside panel (26). An accelerometer (50) for measuring sideways acceleration of the vehicle is mounted to the inside panel (28) of the door (22). The output signal of the accelerometer has a value functionally related to the acceleration of the vehicle in a direction substantially perpendicular to the side of the vehicle. A controller (54, 56, 62, 66) determines the sideways velocity from the accelerometer output signal and deploys the air bag (20) if the velocity exceeds a predetermined value within a predetermined time period. Reinforcement members (310, 312, 314) enhance communication of the sideways acceleration to the accelerometer.

24 Claims, 4 Drawing Sheets

METHOD AND APPARATUS FOR RESTRAINING AN OCCUPANT DURING A SIDE IMPACT

TECHNICAL FIELD

The present invention is directed to a vehicle occupant restraint system and is particularly directed to a method and apparatus for restraining an occupant during a side impact of the vehicle.

BACKGROUND OF THE INVENTION

Vehicle occupant restraint systems having an actuatable restraining device are well known in the art. One particular type of actuatable restraining device includes an inflatable air bag mounted within the occupant compartment of the vehicle in a forward location to protect the occupant during a frontal crash.

Such restraint systems for protecting an occupant during a frontal crash further include a crash sensor for detecting the occurrence of a vehicle frontal crash condition and for providing an electrical signal indicative of the frontal crash condition. Crash sensors in restraint systems that protect the occupant during a frontal crash condition include actuatable switches, inertia switches, or accelerometers.

When the crash sensor indicates that a frontal vehicle crash condition is occurring, an electric current of predetermined magnitude and duration is passed through a squib, i.e., an electrically actuatable ignitor, for the purpose of igniting the squib. The squib, when ignited, ignites a combustible gas generating composition and/or pierces a container of pressurized gas operatively coupled to the air bag. Ignition of the squib, thus, results in inflation of the air bag.

Occupant restraint systems for protecting an occupant during a side impact of the vehicle are also known in the art. Such side impact restraint systems typically include an air bag mounted in the vehicle door or arm rest adjacent the occupant. One known side impact occupant restraint system is disclosed in U.S. Pat. No. 4,966,388 to Warner, et al. This '388 patent discloses an air bag mounted in the vehicle door adjacent the occupant. The side impact crash sensing device disclosed in the '388 patent is a strip switch mounted to the outside panel of the door. The strip switch is designed to provide a crash indication when an object striking the side of the vehicle penetrates the outer door panel by more than about one inch.

Another known side impact restraint system is disclosed in U.S. Pat. No. 5,072,966 to Nishitake, et al. The restraint system of the '966 patent includes an air bag mounted in the vehicle arm rest or inside the door. Two side impact crash sensors are provided for each of the air bag restraints. One of the side impact crash sensors is mounted to a central portion of a door reinforcement member located inside of the door, i.e., the door beam. The second side impact crash sensor is mounted to the vehicle at the bottom of the door sill. Both of the sensors are identified in the '966 patent as being shock sensors.

Automobile original equipment manufacturers have mounted sensors at many different locations in the vehicle for the purpose of measuring accelerations of the vehicle during vehicle crash tests. These sensors are not used for control purposes such as control of an actuatable restraining device, but simply provide acceleration data during the crash test. This test data is used for vehicle design analysis. One known mounting location for a test accelerometer used to collect crash data is the inside panel of a vehicle door.

SUMMARY OF THE INVENTION

The present invention provides a method and apparatus for restraining an occupant during a side impact of a vehicle. The apparatus comprises a deployable restraining means mounted to be operative between an occupant and a side assembly of the vehicle to restrain the occupant. An accelerometer is mounted to the inside panel of the side assembly and provides a signal having a value indicative of sideways acceleration of the vehicle. The restraining means is deployed to an operative position when the acceleration signal indicates that a side impact is occurring which is of such nature that deployment of the restraining means would enhance occupant protection, i.e., a deployment crash condition.

In accordance with one aspect of the invention, an apparatus is provided for restraining an occupant of a vehicle during a side impact of the vehicle with an object. The apparatus comprises a deployable restraining means mounted to be operative between the occupant and a side assembly of the vehicle adjacent the occupant. The side assembly includes an outside panel and an inside panel spaced from the outside panel. An accelerometer for measuring the sideways vehicle acceleration is mounted to the inside panel of the side assembly. The accelerometer provides an output signal having a value functionally related to the sideways acceleration of the vehicle. Means are provided for monitoring the output signal of the accelerometer. Means determines the vehicle velocity value in a sideways direction from the output of the accelerometer. Means are further provided for deploying the restraining means if the determined velocity value is indicative of the occurrence of a deployment crash condition.

In accordance with a preferred embodiment of the present invention, the deployable restraining means is an air bag. The air bag is mounted in the side assembly, the seat back, or the seat cushion. The means for determining the sideways velocity of the vehicle preferably includes means for integrating the output signal of the accelerometer. The means for deploying the restraining device provides an actuation signal when the integration value of the accelerometer signal equals or exceeds the predetermined velocity threshold limit within a predetermined time period. Preferably, the apparatus further includes means for resetting the value of the integration to zero if the value of the integration does not exceed the predetermined velocity threshold limit within the predetermined time period. The accelerometer is preferably mounted in a recess pocket of the inside panel of the side assembly. The side assembly preferably includes means to enhance communication of a sideways acceleration of the vehicle to the accelerometer during a side impact.

In accordance with another aspect of the present invention, a method is provided for restraining an occupant of a vehicle during a side impact of the vehicle with an object. The method comprises the step of mounting a deployable restraining means to be operative between the occupant and a side assembly of the vehicle adjacent the occupant. The side assembly includes an outside panel and an inside panel spaced from the outside panel. The method further includes the step of mounting an accelerometer for measuring the sideways vehicle acceleration to the inside panel of the side assembly. The accelerometer provides an output signal having a value functionally related to the sideways acceleration of the vehicle. The method further comprises the steps of monitoring the output signal of the accelerometer, determining the vehicle velocity in a sideways direction from the accelerometer signal and deploying the restraining means if the determined velocity value is indicative of the occurrence of a deployment crash condition.

In accordance with a preferred embodiment of the invention, the step of deploying the restraining means includes the steps of providing an actuation signal to deploy the restraining means only if the determined sideways velocity value exceeds the predetermined velocity threshold limit within a predetermined time period. The step of determining the sideways velocity of the vehicle includes the step of integrating the acceleration signal. The method preferably includes the step of resetting the value of the integration to zero if the value of the integration does not exceed the predetermined velocity threshold limit within the predetermined time period. Preferably, the step of determining a sideways velocity value is not done until the sensed sideways acceleration of the side assembly exceeds a predetermined value. The preferred method further includes the step of enhancing communication between sideways acceleration of the vehicle and the accelerometer.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which.

DESCRIPTION OF PREFERRED EMBODIMENTS

Figure 1:
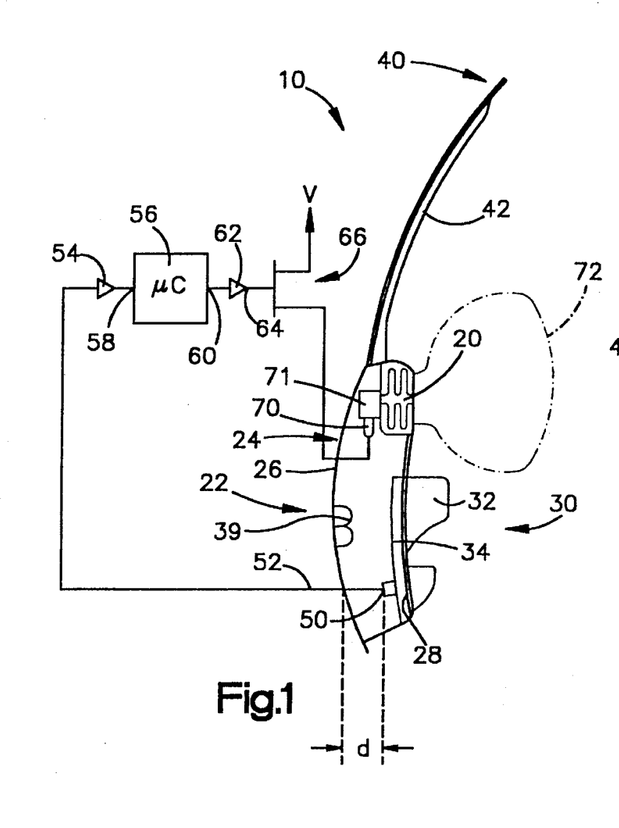
FIG. 1 is a schematic diagram of a side impact vehicle restraint system made in accordance with one embodiment of the present invention showing an end view of a vehicle door.
Figure 2:
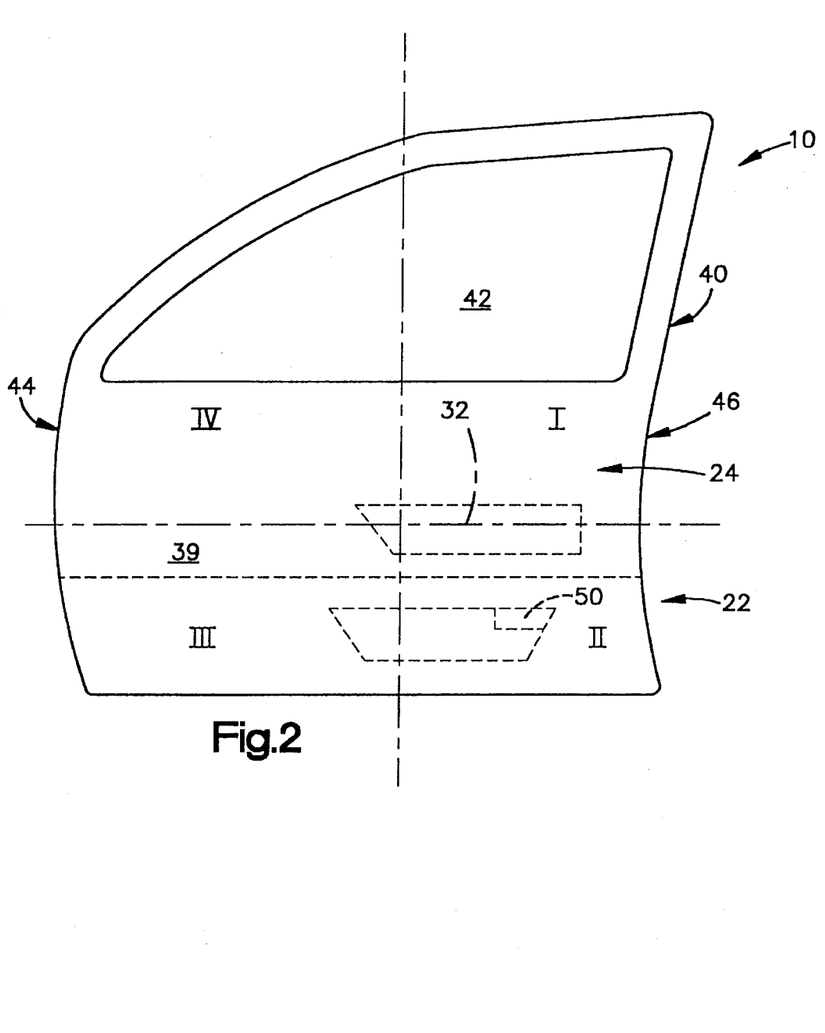
FIG. 2 is a side view of the door shown in FIG. 1 with the door divided into four quadrants.

Referring to FIGS. 1 and 2, a side impact restraint system 10 includes a deployable occupant restraining device 20. The deployable occupant restraining device 20 may take any of several forms. In accordance with a preferred embodiment of the invention, the deployable restraining device is an air bag. The restraining device may also be a deployable pad.

The air bag 20 is mounted to a vehicle door 22. The door 22 shown is the driver's door of a vehicle. It is to be understood that the present invention is applicable to any mounting location of the air bag adjacent an occupant wherein the air bag inflates between the occupant and the side of the vehicle, e.g., the front seat passenger's door, a back seat passenger's door, a side armrest, any side assembly adjacent the occupant, the occupant's seat cushion, or the occupant's seat back.

The door 22 includes a main body portion 24 having an outside panel 26 and an inside panel 28. The outside panel 26 and the inside panel 28 are spaced apart. An interior trim package 30, including the door arm rest 32, is secured to a sheet metal interior liner 34 attached as a backing member to the inside panel 28 in a known manner. The air bag 20, in accordance with one embodiment of the present invention, is mounted in the interior portion of the door 22. When the air bag 20 is inflated, the air bag assumes an operative inflated position between the door 22 and an occupant so as to cushion the occupant during a side impact crash condition of the vehicle.

A door protection beam 39 is secured to the inside of the outside panel 26 of the door 22. This beam 39 is designed to add strength to the outside panel 26 of the door 22 and to provide protection to the occupant from a side impact.

The upper portion of the door 22 includes a frame portion 40 which frames a door window 42, when closed. When the door 22 is in a closed condition, a forwardmost portion 44 of the door 22 is adjacent to the vehicle's "A" pillar (not shown) and the rearward most portion 46 of the door 22 is adjacent to the vehicle's "B" pillar (not shown).

Viewed from outside of the vehicle, the door 22 can be divided into four quadrants. A first quadrant I is the upper rearwardmost quarter portion of the door 22. A second quadrant II is the lower rearwardmost quarter portion of the door 22. A third quadrant III is the lower forwardmost quarter portion of the door 22. A forth quadrant IV is the upper forwardmost quarter portion of the door 22.

An accelerometer 50 is mounted to the inside panel 28 of the door 22 in the lower rearward most quadrant, i.e., quadrant II, of the door. In accordance with one embodiment of the present invention, the accelerometer 50 is mounted to the sheet metal support member 34 that supports the trim package 30 of the door 22. The sensor 50 is below the support beam 39 and below the level of the arm rest 32.

The sensor 50 is preferably a directionally responsive accelerometer having its operative axis oriented perpendicular or normal to the inside panel 28 of the door 22. With this arrangement, the accelerometer 50 has an electrical characteristic that varies as a function of accelerations of the vehicle having a component normal to the door 22, such as occurs during a side impact or side collision of the vehicle with another object, i.e., sideways acceleration of the vehicle. If the vehicle is subjected to a collision from a head-on direction, the accelerometer 50 does not provide a significant output signal since there is no acceleration component perpendicular to the door 22, i.e., no significant sideways acceleration component, as a result of the head-on collision.

Preferably, the accelerometer 50 is of the type manufactured by ICSensors Inc., 1701 McCarthy Blvd., Milpitas, Calif. 95035, under part No. 3021. When such a sensor is appropriately biased, an electrical output signal 52 is provided having a magnitude value and frequency value functionally related to the sideways acceleration of the vehicle, i.e., acceleration of the vehicle in a direction normal to the door 22.

When the sensor 50 is mounted to the inside panel 28, it is a distance "d", measured horizontally, from the outside door panel 26. When an object crashes into the outside door panel 26, or vice versa, the panel crushes an amount functionally related to the force of the impact. If the impact force is greater than a certain value for a certain time period, the outside panel 26 moves inward, i.e., crushes, toward the inside panel 28 to such a degree that the outside panel 26 may hit the sensor 50. If the sensor is hit hard enough by the crushing outside panel, the sensor 50 may be rendered inoperative. The sensor 50 is, by its mounting arrangement, protected during a side impact until the side impact force reaches at least a certain value for at least a certain time period. During a side impact, the sensor 50 provides an output signal indicative of the sideways acceleration even while the outside panel 26 of the vehicle door 22 is crushing. The time period between the start of the side impact crash event to the time when the sensor may be contacted by the outside panel is sufficient to process the acceleration signal and to determine if the air bag should be deployed.

The output 52 of the accelerometer 50 is connected to an amplifier circuit 54. The amplifier circuit 54 amplifies the accelerometer output signal 52. The output of the amplifier circuit 54 is connected to a microcomputer 56 and specifically to an analog-to-digital ("A/D") input 58 of the microcomputer 56. The microcomputer 56 processes the accelerometer signal and determines if the air bag 20 should be deployed, i.e., if the side impact to which the vehicle is subjected is of such nature that deployment of the occupant restraint device 20 would aid in protection of the occupant associated with that restraint device. Crash conditions in which the restraint device is to be deployed are referred to as deployment crash conditions.

The output 60 of the microcomputer 56 is connected to a drive circuit 62. The output 64 of the drive circuit 62 is connected to an electrical switch 66 such as a field effect transistor ("FET"). The switch 66 is operatively connected between a squib 70 and a source of electrical energy V. This power connection arrangement assumes that a second terminal of the squib 70 is connected to electrical ground. If the second terminal of the squib 70 is connected to the electrical supply V, the switch 66 would be connected between the squib and electrical ground.

The squib 70 is operatively connected to a gas source 71 such as a solid combustible gas generating material and/or a pressurized gas bottle. If the microcomputer 56 determines that the sensed side impact is of such nature that the air bag 20 should be deployed, i.e., a deployment crash condition, the output 64 turns ON switch 66 so as to provide a sufficiently large current for a sufficiently long time period to ignite the squib 70. When the squib 70 is ignited, the air bag is inflated so as to assume its operative condition 72.

Figure 3:
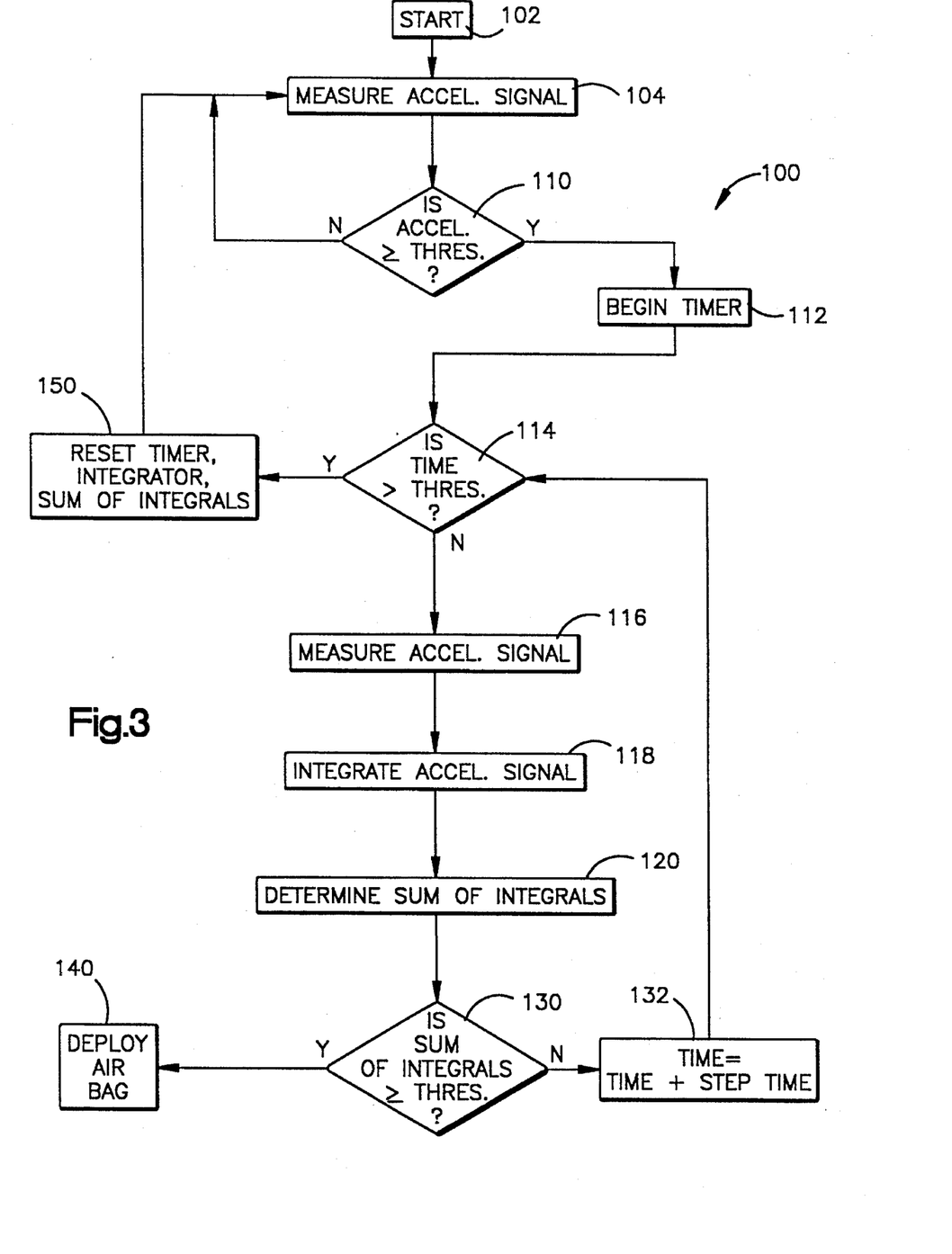
FIG. 3 is a flow chart showing a control process in accordance with the present invention.

Referring to FIG. 3, a control process 100, in accordance with a preferred embodiment of the present invention, is shown. In step 102, an initiation step is performed in which internal memories, timers, integrators, etc., are reset to initial values. This reset occurs at each start-up of the vehicle engine. In step 104, the accelerometer signal is measured by the microcomputer 56. The microcomputer makes a determination in step 110 as to whether the value of the output of the accelerometer is equal to or greater than a predetermined acceleration threshold value. In accordance with a preferred embodiment of the present invention, the predetermined acceleration threshold value is equal to 120 g's (1 g=32,174 ft/sec$^2$). A large acceleration threshold value is used to prevent deployment of the air bag when, for example, the vehicle door is slammed shut with a substantial amount of force.

If the determination in step 110 is negative, the process loops back to step 104 where the accelerometer signal is again monitored. If the determination in step 110 is affirmative, the process proceeds to step 112 where a timer (internal to the microcomputer) is started. The output of the timer is, in effect, a measurement of the elapsed time from when the acceleration threshold was first exceeded.

From step 112, the process proceeds to step 114 where a determination is made as to whether a timer threshold value has been exceeded. In accordance with one preferred embodiment of the present invention, the timer threshold value is set equal to 15 milliseconds. Since the timer was reset to zero in step 102, the determination step 114 is negative the first time through the process. From a negative determination in step 114, the accelerometer signal is measured in step 116. In step 118 the integral of the accelerometer signal is determined over a relatively short time period, i.e., much shorter than the time threshold value used in step 114. The integral value determined in step 118 is summed with all previously determined integral values in step 120. The first time through the steps 116, 118, 120, there are no previously determined integrals, so the integral determined in step 118 is summed with zero in step 120.

A determination is made in step 130 as to whether the sum of the integrals determined in step 120 is equal to or greater than a predetermined integration threshold value. Since the first integral of acceleration is velocity, the predetermined integration threshold value is the same as a predetermined velocity threshold value. If the determination in step 130 is negative, the process proceeds to step 132 where the timer started in step 112 is advanced by one time step. If the timer started in step 112 is a continuously running timer, those skilled in the art will appreciate that step 132 is not used. The process then loops back to step 114. The process stays in loop 114, 116, 118, 120, 130, and 132 ("the integration loop") until the time threshold value is exceeded or the total integration value equals or exceeds the integration threshold value determined in step 130.

The second and subsequent times through the integration loop, the newly determined integral value of step 118 is summed with all the previously determined integral values. In accordance with one embodiment of the invention, the integral is calculated over a plurality of discrete intervals. Those skilled in the art will appreciate that a continuous integration of the acceleration signal over time is equal to the sum of a plurality of integrals over discrete time periods where the sum of the time periods equals the time period of the continuous integration.

If the value of the sum of the integrals (the determined sideways velocity) exceeds the integration threshold value (a velocity threshold value), the determination in step 130 is affirmative, and the control process deploys the air bag 20 in step 140. If the value of the sum of the integrals (the determined velocity) does not exceed the integration threshold value (the velocity threshold) prior to the elapsed time exceeding the time threshold, the determination in step 114 is affirmative and the process proceeds to step 150. In step 150, the timer, the integrator, and the sum of the integral values are all reset to zero values and the process loops back to step 104.

The distance d between the sensor 50 and the outside panel 26 of the door 22 will vary from vehicle type to vehicle type. The strength of the outside panel 26 and the strength provided by the door beam 39 for a particular door structure must be designed or selected so as to provide adequate protection to the sensor 50 during a side impact. The distance d and the door strength are both considered when selecting the initial acceleration threshold value and the integral or velocity threshold value.

Figure 4:
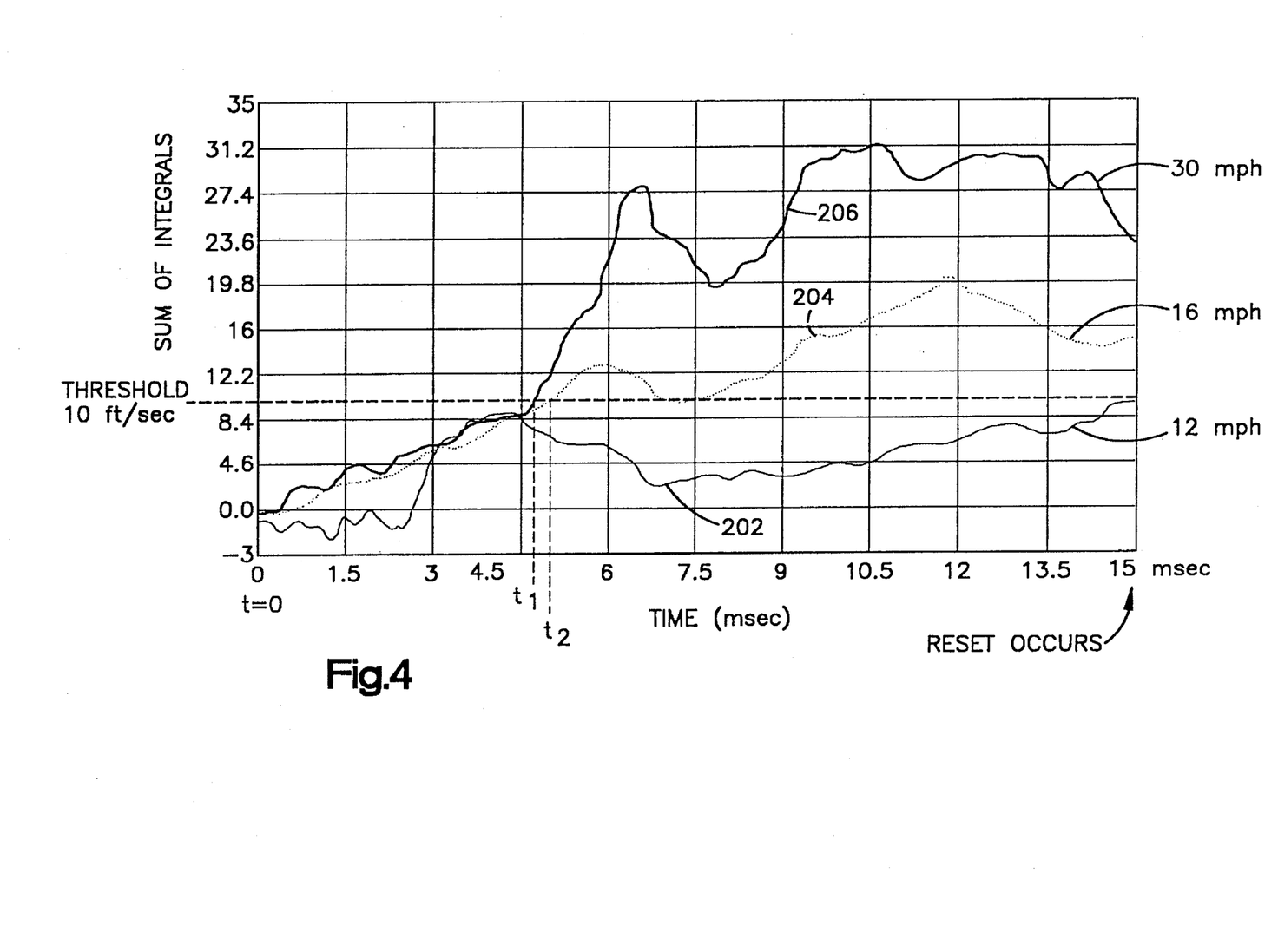
FIG. 4 is a graphical representation of velocity versus time curves for three different side impact crash conditions using the side impact system of FIG. 1.

Referring to FIG. 4, three different side impact crash conditions are depicted for a vehicle having the accelerometer mounted in accordance with the embodiment present invention shown in FIGS. 1 and 2. The sum of the integral values is on the Y axis and time is on the X axis. Time t=0 is the time when the timer is started in step 112. In all three side impacts depicted, the accelerometer signal has been measured (step 104) and the accelerometer signal has exceeded the accelerometer threshold value, i.e., the determination in step 110 is affirmative. Each of the graphs is the sum of the integrals determined in step 120 as a function of the time. The integration threshold value is set at 10 feet/second. The time threshold value used in step 14 is 15 milliseconds. The integration threshold value and time threshold value were selected after considering the door strength and the distance d. Because the time period necessary to perform steps 114, 116, 118, 120, 130, and 132 is very short relative to the time threshold value of 15 milliseconds, the curves shown in the graphs appear relatively smooth as opposed to stepwise as one may expect.

Line 202 is the integral value that results from a side impact into the door 22 with a test barrier traveling at 12 MPH. At no time between time t=0 and the time when the time threshold is exceeded (t=15 msec.) does the value of the sum of the integrals, i.e., the sideways velocity determined from the accelerometer, equal or exceed the integration threshold value of 10 feet/second. Therefore, the process does not deploy the air bag 20 under this side impact crash condition. The timer, integrator, and the sum of the integral value is reset at the 15 msec. point in time.

Line 204 is the integral value that results from a side impact into the door 22 with a test barrier traveling at 16 MPH. At time $t_2$, the sum of the integral values equals the integration threshold value of 10 feet/second. At time $t_2$, the air bag 20 is deployed.

Line 206 is the integral value that results from a side impact into the door 22 with a test barrier traveling at 30 MPH. At time $t_1$, the sum of the integral values equals the integration threshold value of 10 feet/second. At time $t_1$, the air bag 20 is deployed.

A deployment crash condition is one in which the value of the sum of the integrals exceeds a predetermined integration threshold value within a predetermined time period, i.e., the time threshold value. By mounting the sensor 50 to the inside panel 28 of the door 22 so as to space the sensor 50 a distance d from outside panel, a deployment crash condition can be sensed prior to the outside door panel contacting the sensor 50 which may render the sensor inoperative. The amount of crushing of the outside door panel 26 is functionally related to the weight of the vehicle, the strength of the door panel 26, and the strength of the door beam 39. As mentioned, the distance d is used for a particular vehicle to preselect the acceleration threshold value and the integration threshold value. These threshold values can be determined through calculation or by using empirical test techniques.

Figure 5:
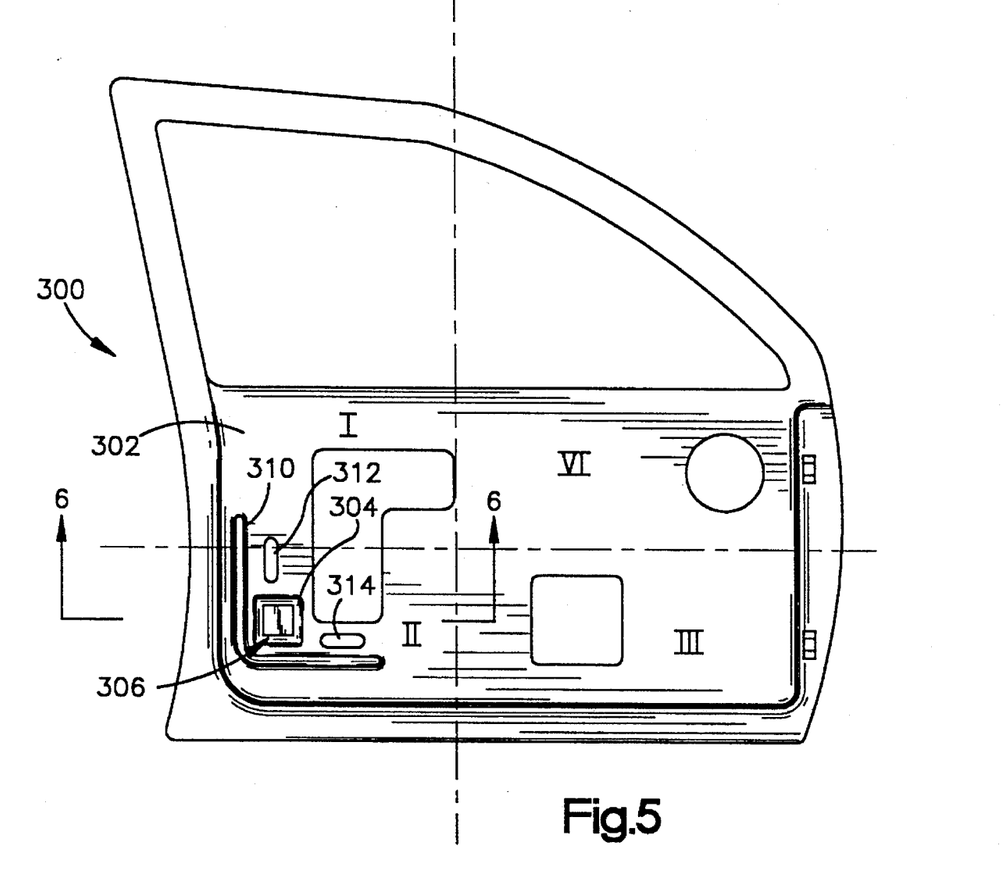
FIG. 5 is a side view of an inside door panel of a vehicle door made in accordance with another embodiment of the present invention.
Figure 6:
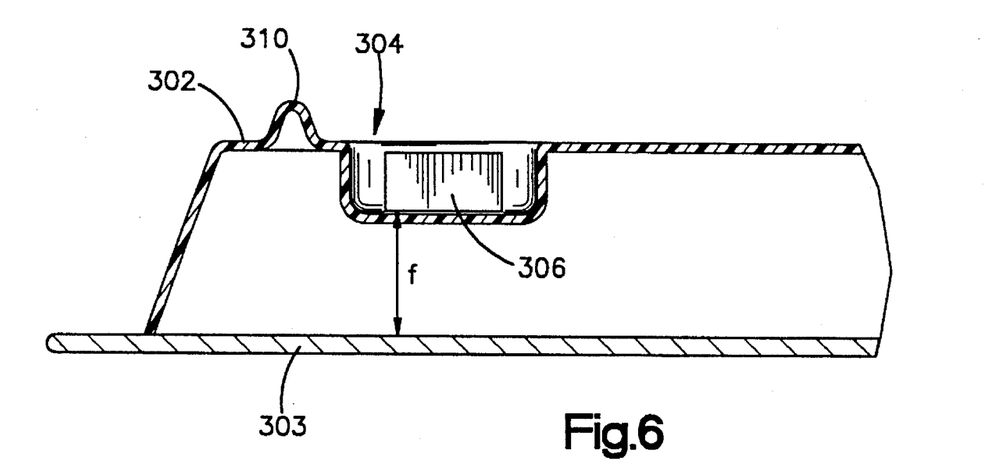
FIG. 6 is a view along line 6—6 of FIG. 5.

Referring to FIGS. 5 and 6, another embodiment of the present invention is shown. In accordance with this embodiment, the vehicle door 300 adjacent the occupant includes an inner door panel 302 spaced a predetermined distance from an outer door panel 303 as in the first embodiment. The inner door panel 302 has a local depression 304 stamped in the panel 302 at the time of manufacture of the panel 302. The depression 304 is preferably located in the lower rearwardmost quadrant II of the door 300.

The depression 304 is adapted to receive an accelerometer 306. The accelerometer 306 is the same as accelerometer 50. The accelerometer is secured in the depression 304 by any one of several means such as by gluing. The depression 304 spaces the accelerometer 306 a distance f from the outer door panel 303 which adds further protection for the accelerometer 306.

A plurality of strengthening or reinforcing beads 310, 312 and 314 are formed in the inner door panel 302. Preferably, these beads are stamped. The purpose of the strengthening beads is to provide better communication to the accelerometer 306 of the sideways acceleration of the vehicle that results from a side impact. Communication of the sideways acceleration is enhanced by limiting acceleration attenuation that would otherwise occur from an unstiffened or unreinforced inner door panel. If the inner door panel was not reinforced, the accelerometer would tend to have an initially lower acceleration during a side impact because the inner door panel would flex. This flexing of the inner door panel has an effect of attenuating the acceleration of the accelerometer.

The reinforcement beads 310, 312, and 314 are preferred embodiments of the present invention. It is contemplated that the inner door panel can be reinforced using any one of a plurality of possible reinforcement means. It is contemplated that holes of predetermined design may be placed at predetermined locations in the inner door panel that will have an effect of stiffening the inner door panel at the location of the accelerometer.

This invention has been described with reference to preferred embodiments. Modifications and alterations may occur to others upon reading and understanding this specification. For example, the present invention was described with regard to use of a microcomputer to determine (a) when the sideways vehicle acceleration threshold is exceeded, (b) the integral of the acceleration (the velocity of the vehicle), and (c) whether the determined integration value (velocity) equaled or exceeded an integration (velocity) threshold value, as well as the monitoring of elapsed time. Those skilled in the art will appreciated that these functions could be accomplished using discrete analog circuitry. It is our intention to include all such modifications and alterations insofar as they come within the scope of the appended claims and the equivalents thereof.

Having fully described the invention, the following is claimed:

1. An apparatus for restraining an occupant of a vehicle during a side impact of the vehicle with an object, said apparatus comprising:

deployable restraining means mounted to be operative between the occupant and a side assembly of the vehicle adjacent the occupant, said side assembly having an outside panel and an inside panel spaced from said outside panel;

an accelerometer for measuring sideways vehicle acceleration, said accelerometer being mounted to the inside panel of said side assembly, said accelerometer providing an output signal having a value functionally related to the sideways acceleration of the vehicle;

means for monitoring said output signal of said accelerometer;

means for determining a vehicle velocity value in a sideways direction from said monitored output signal of said accelerometer; and means for deploying said restraining means if said determined velocity value is indicative of the occurrence of a deployment crash condition.

2. The apparatus of claim 1 wherein said side assembly includes a vehicle door and wherein said accelerometer is mounted to an inside panel of said door at a lower, rearwardmost quadrant of said door.

3. The apparatus of claim 1 wherein said means for deploying said restraining means includes means for providing an actuation signal only if the determined velocity exceeds a predetermined velocity limit within a predetermined time period after a predetermined acceleration value is exceeded, deployment of said restraining means occurring only in response to said actuation signal.

4. The apparatus of claim 3 wherein said means for determining said sideways velocity of said vehicle includes means for integrating said acceleration signal and wherein said means for providing said actuation signal provides said actuation signal when the value of the integration exceeds a predetermined integration limit within said predetermined time period.

5. The apparatus of claim 4 further including means for resetting the value of the integration to zero if said value of the integration does not exceed said predetermined integration limit within said predetermined time period.

6. The apparatus of claim 1 wherein said velocity is not determined until the sensed acceleration of said side assembly exceeds a predetermined acceleration limit.

7. The apparatus of claim 1 wherein said restraining means is an air bag.

8. An apparatus for restraining an occupant of a vehicle during a side impact of the vehicle with an object, said apparatus comprising:

an air bag mounted to inflate between a door and the occupant, said door having an outside panel and an inside panel spaced from said outside panel;

an accelerometer for measuring sideways vehicle acceleration, said accelerometer being mounted to the inside panel of said door at a lower, rearwardmost quarter portion of said door, said accelerometer providing an output signal having a value indicative of whether the vehicle is in a deployment crash condition;

means for monitoring said output signal from said accelerometer;

means for determining a vehicle velocity value in a sideways direction from said monitored output signal of said accelerometer; and means for deploying said air bag if said determined velocity value is indicative of the occurrence of a deployment crash condition.

9. The apparatus of claim 8 wherein said deployment crash condition is when the determined sideways velocity exceeds a predetermined velocity limit, and wherein said means for deploying said air bag includes means for providing an air bag actuation signal to deploy said air bag only when said sideways velocity exceeds a predetermined velocity limit.

10. The apparatus of claim 8 wherein the means for determining sideways velocity of said vehicle includes means for integrating the output of the accelerometer over a predetermined period of time.

11. The apparatus of claim 10 wherein the means for deploying said air bag includes means to deploy said air bag when the value of the integration exceeds a predetermined integration limit within said predetermined period of time.

12. A method of restraining an occupant of a vehicle during a side impact of the vehicle with an object, said method comprising the steps of:

mounting a deployable restraining means to be operative between the occupant and a side assembly of the vehicle adjacent the occupant, said side assembly having an outside panel and an inside panel spaced from said outside panel;

mounting an accelerometer to the inside panel of said side assembly, said accelerometer providing an output signal having a value functionally related to the acceleration of the vehicle in a direction substantially perpendicular to the side of the vehicle;

monitoring said output signal of said accelerometer;

determining sideways velocity of the vehicle from the monitored accelerometer output signal; and deploying said restraining means if said determined sideways velocity is indicative of the occurrence of a deployment crash condition.

13. The method of claim 12 wherein said deployment crash condition is when said sideways velocity exceeds a predetermined velocity limit, and wherein said step of deploying occurs when the sideways velocity exceeds said predetermined velocity limit.

14. The method of claim 12 wherein said step of deploying said restraining means includes the step of providing said actuation signal only if the determined velocity exceeds said predetermined velocity limit within a predetermined time period from when a predetermined accelerometer value is exceeded, deployment of said restraining means occurring in response to said actuation signal.

15. The method of claim 14 wherein said step of determining said sideways velocity of said vehicle includes the step of integrating said acceleration signal and wherein said step of providing said actuation signal includes the step of providing said actuation signal when the value of the integration exceeds a predetermined integration limit within said predetermined time period.

16. The method of claim 15 further including the step of resetting the value of the integration to zero if said value of the integration does not exceed said predetermined integration limit within said predetermined time period.

17. The method of claim 12 wherein said step of determining velocity is not done until the sensed acceleration exceeds a predetermined acceleration limit.

18. The method of claim 12 wherein said step of mounting an accelerometer to the inside panel of said side assembly includes mounting said accelerometer in an inside door panel of a door adjacent the occupant at a lower, rearwardmost quarter portion of said door.

19. An apparatus for restraining an occupant of a vehicle during a side impact of the vehicle with an object, said apparatus comprising:

deployable restraining means mounted to be operative between the occupant and a side assembly of the vehicle adjacent the occupant, said side assembly having an outside panel and an inside panel spaced from said outside panel, said inside panel having a recessed pocket;

an accelerometer for measuring sideways vehicle acceleration, said accelerometer being mounted in said recessed pocket of the inside panel of said side assembly, said accelerometer providing an output signal having a value functionally related to the sideways acceleration of the vehicle;

means for monitoring said output signal of said accelerometer;

means for determining a vehicle velocity value in a sideways direction from said monitored output signal of said accelerometer; and means for deploying said restraining means if said determined velocity value is indicative of the occurrence of a deployment crash condition.

20. An apparatus for restraining an occupant of a vehicle during a side impact of the vehicle with an object, said apparatus comprising:

an accelerometer for measuring sideways vehicle acceleration and providing an output signal having a value functionally related to the sideways acceleration of the vehicle;

deployable restraining means mounted to be operative between the occupant and a side assembly of the vehicle adjacent the occupant, said side assembly having an outside panel and an inside panel spaced from said outside panel, said accelerometer being mounted to said inside panel, said inside panel including reinforcement means for enhancing communication of sideways acceleration of said vehicle to said accelerometer, said accelerometer;

means for monitoring said output signal of said accelerometer;

means for determining a vehicle velocity value in a sideways direction from said monitored output signal of said accelerometer; and means for deploying said restraining means if said determined velocity value is indicative of the occurrence of a deployment crash condition.

21. An apparatus for restraining an occupant of a vehicle during a side impact of the vehicle with an object, said apparatus comprising:

an air bag mounted to inflate between a door and the occupant, said door having an outside panel and an inside panel spaced from said outside panel, said inside panel having a recessed pocket;

an accelerometer for measuring sideways vehicle acceleration, said accelerometer being mounted in said recessed pocket of said inside panel of said door at a lower, rearwardmost quarter portion of said door, said accelerometer providing an output signal having a value indicative of whether the vehicle is in a deployment crash condition;

means for monitoring said output signal from said accelerometer;

means for determining a vehicle velocity value in a sideways direction from said monitored output signal of said accelerometer; and means for deploying said air bag if said determined velocity value is indicative of the occurrence of a deployment crash condition.

22. An apparatus for restraining an occupant of a vehicle during a side impact of the vehicle with an object, said apparatus comprising:

an accelerometer for measuring sideways vehicle acceleration and providing an output signal having a value indicative of whether the vehicle is in a deployment crash condition;

an air bag mounted to inflate between a door and the occupant, said door having an outside panel and an inside panel spaced from said outside panel, said accelerometer being mounted to the inside panel of said door at a lower, rearwardmost quarter portion of said door, said inside panel including reinforcement means for enhancing communication of sideways acceleration of said vehicle to said accelerometer;

means for monitoring said output signal from said accelerometer;

means for determining a vehicle velocity value in a sideways direction from said monitored output signal of said accelerometer; and means for deploying said air bag if said determined velocity value is indicative of the occurrence of a deployment crash condition.

23. A method of restraining an occupant of a vehicle during a side impact of the vehicle with an object, said method comprising the steps of:

mounting a deployable restraining means to be operative between the occupant and a side assembly of the vehicle adjacent the occupant, said side assembly having an outside panel and an inside panel spaced from said outside panel;

providing a recessed pocket in said inside panel;

mounting an accelerometer in the recessed pocket of the inside panel of said side assembly, said accelerometer providing an output signal having a value functionally related to the acceleration of the vehicle in a direction substantially perpendicular to the side of the vehicle;

monitoring said output signal of said accelerometer;

determining sideways velocity of the vehicle from the monitored accelerometer output signal; and deploying said restraining means if said determined sideways velocity is indicative of the occurrence of a deployment crash condition.

24. A method of restraining an occupant of a vehicle during a side impact of the vehicle with an object, said method comprising the steps of:

mounting a deployable restraining means to be operative between the occupant and a side assembly of the vehicle adjacent the occupant, said side assembly having an outside panel and an inside panel spaced from said outside panel;

mounting an accelerometer to the inside panel of said side assembly, said accelerometer providing an output signal having a value functionally related to the acceleration of the vehicle in a direction substantially perpendicular to the side of the vehicle;

reinforcing said inside panel of said side assembly to enhance communication of sideways acceleration of said vehicle to said accelerometer;

monitoring said output signal of said accelerometer;

determining sideways velocity of the vehicle from the monitored accelerometer output signal; and deploying said restraining means if said determined sideways velocity is indicative of the occurrence of a deployment crash condition.

* * * * *